United States Patent Office 3,383,363
Patented May 14, 1968

3,383,363
PERFLUOROCYCLOBUTENE HOMOPOLYMER AND COPOLYMER WITH HEXAFLUOROACETONE
Edward S. Jones, Hanover Township, Morris County, and Whitney H. Mears, Morris Plains, N.J., assignors to Allied Chemical Corporation, New York, N.Y., a corporation of New York
No Drawing. Filed Mar. 16, 1964, Ser. No. 352,357
7 Claims. (Cl. 260—63)

ABSTRACT OF THE DISCLOSURE

Homopolymers of perfluorocyclobutene and copolymers of perfluorocyclobutene and hexafluoroacetone are produced by polymerizing mixtures of perfluorocyclobutene and hexafluoroacetone at temperature of about 225° to 350° and pressure of about 5 to 40 kilobars. The perfluorocyclobutene polymers may be utilized in making films, molded or extruded parts and as dielectric materials.

---

The present invention relates to the polymerization of perfluorocyclobutene and, more particularly, to the production of homopolymers of perfluorocyclobutene and copolymers of perfluorocyclobutene and hexafluoroacetone.

M. W. Buxton et al., J. Chem. Soc. (1952), page 3830, were unable to polymerize perfluorocyclobutene by ultraviolet radiation in a sealed tube at 30–60° C. In an attempt to polymerize perfluorocyclobutene at temperature of 295° C. and pressure of 36 kilobars, no polymerization resulted. Further, no polymerization of perfluorocyclobutene occurred at 175° C. and 36 kilobars using 1% $Hg(CF_3)_2$ as catalyst. Even treating perfluorocyclobutene at 300° C. and 19.5 kilobars using 1% $Hg(CF_3)_2$, only an insignificant amount of a gray powder melting at 130° C. was obtained.

It is an object of the present invention to provide new and useful perfluorocyclobutene homopolymers and copolymers of perfluorocyclobutene and hexafluoroacetone.

Another object of the invention is to provide a process for obtaining perfluorocyclobutene homopolymers and copolymers of perfluorocyclobutene and hexafluoroacetone.

Other objects and advantages inherent in the invention will be apparent to those skilled in the art from the following description.

In accordance with the present invention, perfluorocyclobutene homopolymers or copolymers of perfluorocyclobutene and hexafluoroacetone may be produced by polymerizing a mixture of perfluorocyclobutene and hexafluoroacetone at temperature of about 225° to 350° C. and pressure of about 5 to 40 kilobars.

Perfluorocyclobutene is a colorless gas boiling at 1.1° C., and hexafluoroacetone is a colorless gas boiling at —27° C. Perfluorocyclobutene may be prepared by dimerization of fluoro and chloro ethylenes to form 1,2-dichlorohexafluorocyclobutane, followed by dehalogenation to produce perfluorocyclobutene. Hexafluoroacetone is a commercially available material.

The amount of hexafluoroacetone employed determines whether perfluorocyclobutene homopolymers or copolymers of perfluorocyclobutene and hexafluoroacetone are formed. When hexafluoroacetone is employed in amount below 10 mol percent, as in the order of about 0.1 to about 5 mol percent, of the mixture, the hexafluoroacetone acts as a catalyst in effecting homopolymerization of perfluorocyclobutene. Preferred amounts of hexafluoroacetone range from about 0.25 to about 2 mol percent of the mixture. When, however, the hexafluoroacetone is employed in amount of at least about 10 mol percent, as in the order of about 10 to about 90 mol percent, of the mixture, the hexafluoroacetone acts not only as a catalyst but also as a comonomer in the polymerization reaction.

In preparation of homopolymers of perfluorocyclobutene, it has been found that the hexafluoroacetone, particularly at the preferred mol ratios, may be employed in the form of hexafluoroacetone hydrate. This material is a liquid within the temperature range bounded by a melting point of about —11° C. and a boiling point of about 105° C.

We have found as the amount of hexafluoroacetone is increased from 10 mol percent to 50 mol percent, the quantity of hexafluoroacetone combining with the perfluorocyclobutene increases until at about 50 mol percent hexafluoroacetone as much as one unit of hexafluoroacetone combines with four units of perfluorocyclobutene. Increasing the amount of hexafluoroacetone above about 50 mol percent does not permit additional hexafluoroacetone to enter the polymer molecule.

In production of the perfluorocyclobutene polymers of this invention, it is essential to employ pressures of about 5 up to 40 kilobars or higher (after correction for friction). At pressures below 10 kilobars, the polymers tend to be viscous liquids instead of preferred solid products. Pressures above 40 kilobars may be employed but are limited by equipment considerations. Outstanding results are obtained at pressures of about 20 to 40 kilobars. As the pressure is increased, higher yield and melting range temperature (indicating higher degree of polymerization) of polymer tend to result.

It is also essential to maintain polymerization temperatures of about 225° to 350° C. At temperatures below 250° C., lower polymer yields are obtained, while at temperatures in excess of 325° C., the polymers tend to be viscous liquids. Outstanding results have been obtained at temperatures of 275° to 325° C. at the preferred pressures.

The polymerization time is not critical and may be as low as ¼ hour up to 18 hours or higher. Excellent results have been obtained by carrying out the polymerization over a period from 3 to 18 hours.

As initially formed under high pressure, the polymer often contains dissolved hexafluoroacetone. If desired, the polymer may be heated to a temperature of at least 100° C., e.g., at about 170° C., under vacuum, e.g., at about 1 mm. Hg pressure, for one to two hours. Gaseous hexafluoroacetone evolves foaming the polymer to over twice its volume and leaving a porous mass which is easily crushed to a powder.

In operation, the reactants, in purified form, are desirably condensed into a suitable reactor and exposed to high temperature and pressure. If hexafluoroacetone hydrate is used as catalyst, it is already in liquid form. Use of a reactor constructed of nickel is desirable since it is resistant to corrosion by perfluorocyclobutene and hexafluoroacetone. After the reaction is completed, the reactor is opened and the polymer is then recovered.

The perfluorocyclobutene polymers of this invention are generally solid materials melting in a range of from about 75° to 350° C. The melting ranges are measured by microscope and heated stage.

Preparation of the perfluorocyclobutene homopolymers and copolymers of perfluorocyclobutene and hexafluoroacetone of this invention is illustrated by the following examples, in which parts are by weight.

Using vacuum line techniques, purified perfluorocyclobutene and hexafluoroacetone were condensed into a nickel capsule. The condensing medium was liquid nitrogen at atmospheric pressure. While still in the liquid nitrogen, the capsule was closed by crimping its neck, cutting it off and silver soldering. The filled capsule was placed in a seal tube-pyrophyllite furnace assembly and this, in turn was inserted into a piston-cylinder device of the type described by F. R. Boyd and J. L. England, J. Geophys. Res., 65 (1960), page 741. Pressure was applied to the charge which was then heated electrically. After allowing the reactor to cool, the pressure was released and the capsule removed. The capsule was then opened, and the polymer product was heated to 170° C. for 1½ hours under 1 mm. Hg vacuum to remove dissolved hexafluoroacetone.

The effect of process variables is shown in the tables set forth below:

CF$_3$ groups to eight CF$_2$ groups to eight CF groups. The NMR results, therefore, indicated a ratio of four units of perfluorocyclobutene per unit of hexafluoroacetone, as represented by the following structure:

$$\left[\begin{array}{c}CF_3\\|\\-C-O-\\|\\CF_3\end{array}\left(\begin{array}{cc}F&F\\|&|\\|&|\\F_2&F_2\end{array}\right)\right]_4$$

On heating the copolymers to 650° C., a strong chromatograph peak containing the perfluorocyclobutene monomer appeared in the cracked products. At this temperature the hexafluoroacetone decomposed to CO and CO$_2$ plus combined fragments from the CF$_3$ radicals.

Similar NMR tests indicated that the polymers of other

TABLE I.—TIME VARIATION

[Temperature=295° C., pressure=36 kb., hexafluoroacetone=48.8 mol percent]

| Example | Time, Hrs. | Charge, Parts | Product, Parts | Reduced Viscosity,[1] Centipoises | Yield,[2] Wt. Percent | Melting Range, °C. |
|---|---|---|---|---|---|---|
| 1 | 18 | 5.43 | 2.56 | 0.103 | 93 | 230–260 |
| 2 | 3 | 5.41 | 2.52 | 0.122 | 92 | 230–275 |
| 3 | ([3]) | 5.82 | [4] 1.37 | 0.09 | 50 | 200–215 |

[1] 1% solution in hexafluorobenzene.
[2] Based on perfluorocyclobutene charged.
[3] 20 mins.
[4] 50% perfluorocyclobutene unreacted.

TABLE II.—PRESSURE VARIATION

[Temperature=295° C., time=18 hours]

| Example | Pressure, kb. | Hexafluoroacetone, Mol Percent | Charge, Parts | Product, Parts | Reduced Viscosity,[1] Centipoises | Yield,[2] Wt. Percent | Melting Range, °C. |
|---|---|---|---|---|---|---|---|
| 1 | 36 | 48.8 | 5.43 | 2.56 | 0.103 | 93 | 230–260 |
| 4 | 19.5 | 50.0 | 5.13 | 1.85 | 0.056 | 73 | 190–255 |
| 5 | 11.4 | 47.0 | 5.54 | 1.66 | 0.034 | 58 | 80–135 |
| 6 | 4.7 | 53.8 | 5.24 | 0.25 | | 8 | ([3]) |

[1] 1% solution in hexafluorobenzene.
[2] Based on perfluorocyclobutene charged.
[3] Viscous liquid.

TABLE III.—TEMPERATURE VARIATION

[Pressure=19.5 kb., time=18 hours]

| Example | Temperature, °C. | Hexafluoroacetone, Mol Percent | Charge, Parts | Product, Parts | Reduced Viscosity,[1] Centipoises | Yield,[2] Wt. Percent | Melting Range, °C. |
|---|---|---|---|---|---|---|---|
| 7 | 250 | 47.6 | 5.55 | 1.30 | 0.119 | 43 | 220–250 |
| 4 | 295 | 50.0 | 5.13 | 1.85 | 0.056 | 73 | 190–255 |
| 8 | 350 | 48.7 | 5.47 | 0.6 | | 21 | ([3]) |

[1] 1% solution in hexafluorobenzene.
[2] Based on perfluorocyclobutene charged.
[3] Gas plus viscous liquid.

TABLE IV.—VARIATION OF HEXAFLUOROACETONE CONTENT

[Temperature=295° C., pressure=19.5 kb., time=18 hours]

| Ex. | Hexafluoroacetone, Mol Percent | Charge, Parts | Product, Parts | Reduced Viscosity,[1] Centipoises | Yield,[2] Wt. Percent | Melting Range, °C. |
|---|---|---|---|---|---|---|
| 4 | 50.0 | 5.13 | 1.85 | 0.056 | 73 | 190–255 |
| 9 | 23.6 | 5.72 | 4.01 | 0.082 | 92 | 215–250 |
| 10 | 10.0 | 5.79 | 4.18 | 0.114 | 80.5 | 205–250 |
| 11 [3] | 1.0 | 5.64 | 5.09 | 0.470 | 90 | 325–345 |
| 12 | 0.0 | 5.43 | 0.0 | | 0 | |
| 13 | 82.5 | 5.58 | 0.92 | 0.136 | 100 | 220–250 |

[1] 1% solution in hexafluorobenzene.
[2] Based on perfluorocyclobutene charged.
[3] 36 kb. pressure.

Evidence of the presence of hexafluoroacetone in the copolymer of Example 1 was indicated by an NMR (nuclear magnetic resonance) test which showed the presence of CF$_3$ groups. In detail, a solution of the copolymer in hexafluorobenzene was examined for F$^{19}$ NMR observation at room temperature using a Varion HR–60 Spectrometer. Chemical shifts (p.p.m.) with respect to CFCl$_3$ and assignments were as follows: +68.5 (CF$_3$), +80.5 (CF$_3$COCF$_3$), +123 (CF$_2$), +166 (C$_6$F$_6$) and +180 (CF). After heating at 170° C. to constant weight, the +80.5 peak disappeared but the CF$_3$, CF$_2$ and CF peaks remained unchanged. The relative areas of the peaks averaged from five measurements for CF$_3$, CF$_2$ and CF were 1.0, 2.6 and 1.3, respectively. This corresponds to two representative examples contained the following ratio of perfluorocyclobutene units per unit of hexafluoroacetone:

Example 2—6:1
Example 4—15:1
Example 9—100:1
Example 10—100:1

The polymer of Example 11 contained no hexafluoroacetone.

The preferred perfluorocyclobutene polymers of this invention are those whose reduced viscosity measurements gave values of at least about 0.09 centipoise. These values correspond to molecular weights of at least about 8,000.

The perfluorocyclobutene polymers of the invention are soluble in hexafluorobenzene and films can be made from them. The polymers can also be utilized in making molded or extruded parts. Further, the polymers may be employed as dielectric materials.

In tests run on a polymer containing 100 units of perfluorocyclobutene per unit of hexafluoroacetone (Example 10) and a polymer containing 4 units of perfluorocyclobutene per unit of hexafluoroacetone (Example 2), a 10 percent by weight sample of the polymer was dissolved in hexafluorobenzene and applied to glass and to a mirror as a film. Both samples gave clear films which were very hydrophobic. Films of this type may be suitably used between metal plates in capacitors.

Since various changes and modifications may be made in the invention without departing from the spirit thereof, the invention is deemed to be limited only by the scope of the appended claims.

We claim:

1. A copolymer of perfluorocyclobutene and hexafluoroacetone containing at least 4 units of perfluorocyclobutene per unit of hexafluoroacetone.

2. A copolymer of perfluorocyclobutene and hexafluoroacetone prepared from a mixture containing about 10 mol percent to about 90 mol percent of perfluorocyclobutene and correspondingly about 90 mol percent to about 10 mol percent of hexafluoroacetone at temperature of about 225° to 350° C. and pressure of at least about 5 kilobars.

3. A process for preparing a perfluorocyclobutene homopolymer which comprises polymerizing a mixture of perfluorocyclobutene and hexafluoroacetone, said mixture containing about 0.1 mol percent to about 5 mol percent of hexafluoroacetone, at temperature of about 225° to 350° C. and pressure of about 5 to 40 kilobars.

4. The process of claim 3 wherein the mixture contains about 0.25 mol percent to about 2 mol percent of hexafluoroacetone.

5. A process for preparing a copolymer of perfluorocyclobutene and hexafluoroacetone which comprises polymerizing a mixture containing about 10 mol percent to about 90 mol percent of perfluorocyclobutene and correspondingly about 90 mol percent to about 10 mol percent of hexafluoroacetone at temperature of about 250° to 350° C. and pressure of about 10 to 40 kilobars.

6. The process of claim 5 wherein the mixture contains about 10 mol percent to about 50 mol percent of perfluorocyclobutene and correspondingly about 50 mol percent to about 10 mol percent of hexafluoroacetone.

7. The process of claim 6 wherein the temperature is about 275° to 325° C. and the pressure is about 20 to 40 kilobars.

References Cited

UNITED STATES PATENTS

| | | | |
|---|---|---|---|
| 2,436,142 | 2/1948 | Harmon | 260—648 |
| 2,511,258 | 6/1950 | Harmon | 260—87.5 |

WILLIAM H. SHORT, *Primary Examiner.*

L. L. LEE, *Assistant Examiner.*